United States Patent

Hashimoto et al.

(10) Patent No.: US 6,682,800 B2
(45) Date of Patent: Jan. 27, 2004

(54) MAGNETIC RECORDING MEDIUM

(75) Inventors: Hiroshi Hashimoto, Odawara (JP);
Masahiko Mori, Odawara (JP);
Takeshi Harasawa, Odawara (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 112 days.

(21) Appl. No.: 09/789,632

(22) Filed: Feb. 22, 2001

(65) Prior Publication Data

US 2001/0023031 A1 Sep. 20, 2001

(30) Foreign Application Priority Data

Feb. 23, 2000 (JP) ........................................ 2000-045584

(51) Int. Cl.$^7$ .............................................. G11B 5/725
(52) U.S. Cl. ................ 428/65.4; 428/336; 428/694 BS; 428/694 BP
(58) Field of Search ..................... 428/694 BS, 694 BP, 428/65.4, 336

(56) References Cited

U.S. PATENT DOCUMENTS

| | | | | |
|---|---|---|---|---|
| 4,201,809 A | * | 5/1980 | Ogawa et al. | 428/65 |
| 4,748,090 A | * | 5/1988 | Yamamoto et al. | 428/694 |
| 5,700,541 A | * | 12/1997 | Okita et al. | 428/65.4 |
| 5,840,410 A | * | 11/1998 | Oiri et al. | 428/212 |

FOREIGN PATENT DOCUMENTS

EP 0 865 034 * 9/1998

* cited by examiner

Primary Examiner—Stevan A. Resan
(74) Attorney, Agent, or Firm—Sughrue Mion, PLLC

(57) ABSTRACT

The present invention provides a magnetic recording medium, which comprises a primer layer containing at least a nonmagnetic lower layer on a support and at least one layer of magnetic layer with ferromagnetic powder dispersed in a binder, said magnetic layer being provided on said primer layer, whereby at least one type of compounds selected from the following general formulae (1) and (2) is contained at least in the primer layer:

General formula (1)

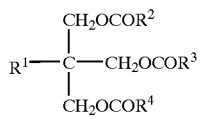

General formula (2)

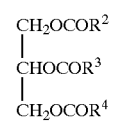

where $R^1$ is an alkyl group with 1 to 2 carbon atoms; and $R^2$, $R^3$, and $R^4$ each represents a hydrocarbon group having 4 to 21 carbon atoms.

7 Claims, No Drawings

MAGNETIC RECORDING MEDIUM

BACKGROUND OF THE INVENTION

The present invention relates to a magnetic recording medium containing ferromagnetic powder as a magnetic layer and used for high density recording. In particular, the invention relates to a magnetic medium having good storage property and high resistance to damage.

As a magnetic recording medium to be used in applications such as audio device, video device and computer, a magnetic recording medium is used, which comprises a magnetic layer with ferromagnetic powder dispersed in a binder, and the magnetic layer is placed on a nonmagnetic support.

In recent years, digital recording with better recording quality and less deterioration in quality compared with conventional type analog recording has rapidly propagated also in the field of video tape recorder for home use. In general, a far larger number of signals are recorded in the digital recording compared with analog recording. Also, the recording and reproduction systems and the recording medium must be higher picture quality and better tone quality and must be produced in more compact size and space-saving design, and there are much expectations on achieving high density recording.

To achieve high density recording, it is necessary to use recording signal with shorter wavelength and to have narrower recording track. For this purpose, it is necessary to have ferromagnetic powder of finer particle size and higher filling ratio and to attain smoother surface of the medium. At the same time, it is essential to have higher writing and reading speed to and from the recording medium, and attempts have been made to improve number of revolutions of cylinder or moving speed of the magnetic tape.

In the devices and equipment using the magnetic recording medium, there have been problems in that magnetic head is often stained and contaminated due to the sliding and the contact between the medium and the magnetic head. In particular, in case of a device for high density recording, number of revolutions of the magnetic head is increased. In a digital video tape recorder, the number of revolutions of the magnetic head is usually 9600 rpm, and this is much higher compared with 1800 rpm in an analog video tape recorder for home use and 5000 rpm in a tape recorder for business use. The rate or the speed of sliding of the magnetic recording medium on the magnetic head is increased. With the increase of the sliding speed between the magnetic recording medium and the magnetic head, there are now strong demands on a magnetic recording medium, which has high durability to endure high-speed sliding and has high resistance to damage.

Not only for a tape type magnetic recording medium but also for a disk type magnetic recording medium, there are demands on a magnetic recording medium for high density typically represented by Zip (Iomega Inc.), which is rotated at higher speed than the conventional type floppy disk. Also, in this type of product, there are now strong demands on a magnetic recording medium, which has high durability and high resistance to damage.

To solve these problems, it has been proposed to use a magnetic recording medium containing various types of lubricants in the magnetic layer, and there have been attempts to produce a magnetic recording medium, which contains ferromagnetic metal powder dispersed in a binder so that high durability can be provided in high density recording and to perform recording and reproduction in stable manner. Also, it has been proposed to use various types of triester or tetraester as lubricants when an ester compound is used as lubricant.

For instance, U.S. Pat. No. 4,201,809 describes the use of triester or tetraester obtained from trimethylolpropane, trimethylolethane, or pentaerythritol as lubricant. However, these products are insufficient in durability and not suitable for the use on a high density recording medium such as digital recording tape.

JP-86026134(B) discloses a magnetic recording medium, which uses triester of trimethylolpropane as lubricant. This product is also insufficient in durability and has lower electromagnetic transfer characteristics in the high density magnetic recording medium.

JP-59065931(A) describes a magnetic recording medium, which simultaneously uses diester, tetraester, and monoester together with triester of trimethylolpropane as lubricant. This product is also not satisfactory in both durability and electromagnetic transfer characteristics for high density recording.

JP-61139921(A) describes a magnetic recording medium, which uses fatty acid ester of polyhydric alcohol and phosphoric acid ester of phenoxydiethylene glycol as lubricant. This product is also not satisfactory in both durability and electromagnetic transfer characteristics in high density recording.

U.S. Pat. No. 4,696,869 discloses a magnetic recording medium, which uses ester of trimethylolpropane or ester of pentaerythritol, and monoester as lubricant. This product is also not satisfactory in both durability and electromagnetic transfer characteristics in high density recording.

U.S. Pat. No. 5,258,223 proposes a magnetic recording medium, which has higher electromagnetic transfer characteristics in the recording of short wavelength and is produced by forming a nonmagnetic lower layer and a thin upper magnetic layer. In the description as disclosed, the product is also not satisfactory in durability.

SUMMARY OF THE INVENTION

The object of the present invention can be solved by the use of a magnetic recording medium, which comprises a primer layer containing at least a nonmagnetic lower layer on a support and at least one layer of magnetic layer with ferromagnetic powder dispersed in a binder, said magnetic layer being provided on said primer layer, whereby at least one type of compounds selected from the following general formulae (1) and (2) is contained at least in the primer layer:

General formula (1)

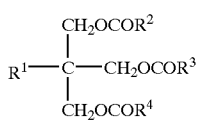

General formula (2)

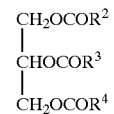

where
$R^1$ is an alkyl group with 1 to 2 carbon atoms; and
$R^2$, $R^3$, and $R^4$ each represents a hydrocarbon group having 4 to 21 carbon atoms.

Also, the present invention provides the magnetic recording medium as described above, wherein thickness of the magnetic layer is within the range of 0.05 to 1 μm.

Further, the present invention provides the magnetic recording medium as described above, wherein the medium is a disk type magnetic recording medium.

DESCRIPTION OF THE PREFERRED EMBODIMENT

The present invention provides a magnetic recording medium for high density recording, which has high durability and good electromagnetic transfer characteristics, and this is accomplished by the use of lubricants with specific chemical structure.

In particular, it has been found in the present invention that, when triester compound of the present invention is added to a primer layer, which comprises at least a non-magnetic lower layer and a magnetic layer coated on it and is prepared by drying and by calender processing, it is possible to obtain a magnetic layer with very smooth surface. It was also found that the magnetic recording medium thus obtained has very high durability, particularly, high-seed durability under high temperature condition.

As the lubricant to be used in the present invention, it is preferable to use a triester compound having the following chemical formulae:

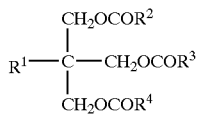

General formula (1)

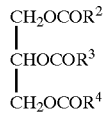

General formula (2)

where $R^1$ is an alkyl group with 1 to 2 carbon atoms; and $R^2$, $R^3$, and $R^4$ each represents a hydrocarbon group having 4 to 21 carbon atoms.

In the magnetic recording medium of the present invention, it is preferable that it contains at least one of the lubricants expressed by the general formula (1) or (2).

In particular, it is preferable that $R^1$ is a methyl group or an ethyl group.

Also, $R^2$, $R^3$, or $R^4$ is preferably a hydrocarbon group having 8 to 17 carbon atoms, and these may be the same or different from each other. If $R^2$, $R^3$, or $R^4$ has less than 4 carbon atoms in the hydrocarbon group, it is too volatile. When the temperature on the magnetic recording medium is increased due to friction, the quantity of the lubricant on the surface of the magnetic layer is decreased, and the durability is decreased. On the other hand, when the number of carbon atoms is increased, viscosity is increased and liquid lubricating property is decreased. As a result, the durability will be lower.

As these hydrocarbon groups, either saturated hydrocarbon group or unsaturated hydrocarbon group may be used. In general, it is preferable to use saturated hydrocarbon group because it is stable under storage condition. Also, either branched or straight-chain hydrocarbon group may be used, while it is preferable to use straight-chain group to obtain a magnetic recording medium having low viscosity and high durability.

As the triester compounds expressed by the general formula (1) or (2), the following compounds may be used:

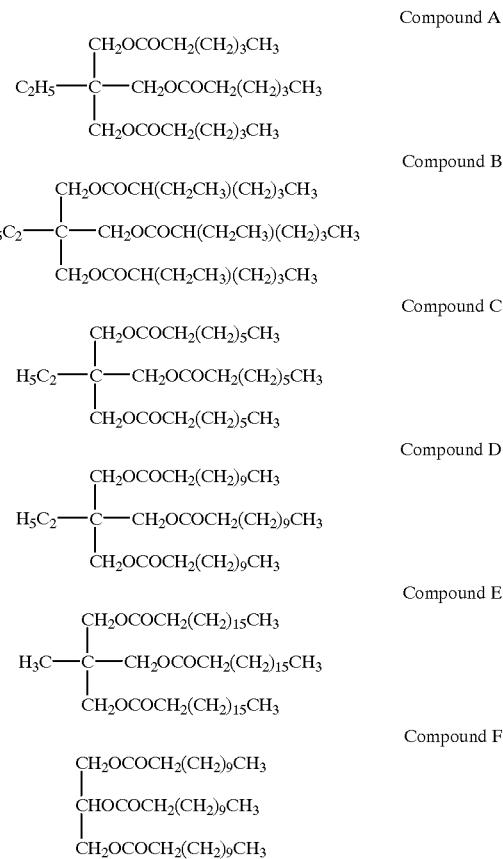

In addition to the lubricants containing triester compound expressed by the general formula (1) or (2), an additive having lubricating effect, antistatic effect, dispersion effect, plasticizing effect, etc. may be used in the magnetic recording medium of the present invention. For instance, molybdenum disulfide, tungsten disulfide, graphite, boron nitride, graphite fluoride, silicone oil, silicone having polar group, fatty acid denatured silicone, fluorine-containing silicone, fluorine-containing alcohol, fluorine-containing ester, polyolefin, polyglycol, alkyl phosphoric acid ester, and its alkali metal salt, alkyl sulfuric acid ester and its alkali metal salt, polyphenyl ether, phenylsulfonic acid, aminoquinones, various types of silane coupling agents, titanium coupling agents, fluorine-containing alkyl sulfuric acid ester, and its alkali metal salt, monobasic fatty acid having 10 to 24 carbon atoms (may contain unsaturated bonding or may be branched), and metal salt of these compounds (such as Li, Na, K, Cu, etc.), monohydric, dihydric, trihydric, tetrahydric, pentahydric or hexahydric alcohol having 12 to 22 carbon atoms (may contain unsaturated bonding or may be branched), alkoxy alcohol having 12 to 22 carbon atoms, monobasic fatty acid having 10 to 24 carbon atoms (may contain unsaturated bonding or may be branched), mono-fatty acid ester or di-fatty acid ester containing either one of monohydric, dihydric, trihydric, tetrahydric, pentahydric or hexahydric alcohol having 2 to 12 carbon atoms (may contain unsaturated bonding or may be branched), fatty acid ester of monoalkyl ether of alkylene oxide polymerized product, fatty acid amide having 8 to 22 carbon atoms, aliphatic amine having 8 to 22 carbon atoms, etc. may be used.

As the monoester compounds, it is preferable to use saturated fatty acid monoester, unsaturated fatty acid monoester, ester of alkylene oxide added alcohol with fatty acid, etc.

Also, it is preferable to use n-butyl stearate, sec-butyl stearate, n-butyl palmitate, n-butyl myristate, isoamyl stearate, isoamyl palmitate, isoamyl myristate, 2-ethylhexyl stearate, 2-ethylhexyl palmitate, 2-ethylhexyl myristate, oleyl oleate, oleyl stearate, stearyl stearate, butoxyethyl stearate, butoxydiethylene glycol stearate, etc.

As the fatty acid, it is preferable to use palmitoleic acid, oleic acid, erucic acid, linoleic acid, stearic acid, palmitic acid, myristic acid, etc.

As the binder preferable to use for the magnetic layer and the nonmagnetic layer, thermoplastic resin, thermosetting resin, reactive resin or mixture of these compounds may be used. It is preferable to use thermoplastic resin having glass transition temperature of −100° C. to +150° C., number average molecular weight of 1,000 to 200,000, or more preferably 10,000 to 100,000 and polymerization degree of about 50 to 1,000.

As examples of these compounds, there are polymer or copolymer, which contains vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinylbutyral, vinylacetal, vinylether, etc. as constituent units, or polyurethane resin, various types of rubber type resin. As the thermosetting resin or reactive resin, phenol resin, epoxy resin, polyurethane curing type resin, urea resin, melamine resin, alkyd resin, acrylic reactive resin, formaldehyde resin, silicone resin, epoxy-polyamide resin, mixture of polyester resin with isocyanate prepolymer, mixture of polyester polyol with polyisocyanate, mixture of polyurethane with polyisocyanate, etc. may be used. The details of these resins are described in: "Handbook of Plastics", published by Asakura Shoten, Ltd. Also, it is possible to use electron beam curing resin of known type for each of the above layers. The examples of these compounds and the methods to manufacture these compounds are described in detail in JP-62-256219(A). The above resins may be used alone or in combination. It is preferable to use a combination of polyurethane resin with at least one type selected from vinyl chloride resin, vinyl chloride—vinyl acetate copolymer, vinyl chloride—vinyl acetate—vinyl alcohol copolymer, vinyl chloride—vinyl acetate—maleic acid anhydride copolymer, or a combination of polyisocyanate with these compounds.

The triester compound of the present invention has high affinity to vinyl chloride type binder, and polyurethane type binder, and it is preferable to use these compounds as the binder. In particular, as the binder for the primer layer, it is preferable to use vinyl chloride type binder and polyurethane type binder.

In the vinyl chloride type binder, the following compounds may be copolymerized: acryl compound such as alkyl acrylate, alkyl methacrylate, etc., methacrylic monomer, allyl ether such as allyalkyl ether, fatty acid vinyl ester such as vinyl acetate, vinyl propionate, etc., vinyl monomer such as styrene, ethylene, butadiene, and monomer having functional group such as hydroxy group, epoxy group, or polar group as to be described later.

As the polyurethane, the following compounds may be used: polyester urethane, polyether urethane, polycarbonate urethane, polyetherester urethane, acrylic type polyurethane, etc.

Glass transition temperature (Tg) of the polyurethane is preferably within the range of −50° C. to +200° C., or more preferably 20° C. to 100° C. If glass transition temperature is too low, durability is decreased. If it is too high, calender moldability is decreased, and this decreases smoothness and electromagnetic transfer characteristics.

It is preferable that the binder contains —COOM, —$SO_3M$, —$SO_4M$, —$PO(OM)_2$, —$OPO(OM)_2$, amino group, quaternary ammonium base etc. as the polar group in an amount of $1\times10^{-5}$ eq/g to $2\times10^{-4}$ eq/g. If the amount of these polar groups is lower than $1\times10^{-5}$ eq/g, dispersion property is decreased. If it is higher than $2\times10^{-4}$ eq/g, dispersion property is also decreased.

Also, it is preferable that OH group is introduced as a curing functional group for isocyanate curing agent. Or, epoxy group, SH group, CN group, —$NO_2$ group, etc. may be introduced in it.

The content of the binder in the magnetic layer is preferably 10 to 25 weight parts to 100 weight parts of the ferromagnetic fine powder including curing agent.

Concrete examples of the binder to be used in the present invention are as follows: VAGH, VYHH, VMCH, VAGF, VAGD, VROH, VYES, VYNC, VMCC, XYHL, XYSG, PKHH, PKHJ, PKHC, and PKFE (manufactured by Union Carbide, Inc.), MPR-TA, MPR-TA5, MPR-TAL, MPR-TSN, MPR-TMF, MPR-TS, MPR-TM, and MPR-TAO (manufactured by Nisshin Chemical Industry Co., Ltd.), 1000W, and 100FD (manufactured by Denki Kagaku Kogyo Co., Ltd.), MR-104, MR-105, MR110, MR100, MR555, and 400X-110A (manufactured by Nippon Zeon Co., Ltd.), Nipporan N2301, N2302, and N2304 (manufactured by Nippon Polyurethane Industry Co., Ltd.), Pandex T-5105, T-R3080, T-5201, Barnock D-400, D-210-80, Crisbon 6109 and 7209 (manufactured by Dainippon Ink Co., Ltd.), Vylon UR8200, UR8300, UR8700, RV530, and RV280 (manufactured by Toyobo Co., Ltd.), Daifelamine 4020, 5020, 5100, 5300, 9020, 9022 and 7020 (manufactured by Dainichi Seika Color & Chemicals Mfg. Co., Ltd.), MX5004 (manufactured by Mitsubishi Chemical Corporation), Sanprene SP-150 (manufactured by Sanyo Kasei Chemical Industries, Ltd.), Saran F310 and F210 (manufactured by Asahi Chemical Industry Co., Ltd.), etc.

As the ferromagnetic powder to be used in the magnetic layer of the present invention, it is preferable to use ferromagnetic alloy powder containing α-Fe as main component. These ferromagnetic powders may contain, in addition to the atoms as designated, the following atoms: Al, Si, S, Sc, Ca, Ti, V, Cr, Cu, Y, Mo, Rh, Pd, Ag, Sn, Sb, Te, Ba, Ta, W. Re, Au, Hg, Pb, Bi, La, Ce, Pr, Nd, P, Co, Mn, Zn, Ni, Sr, B, etc. In particular, it is preferable that it contains at least one type of Al, Si, Ca, Y, Ba, La, Nd, Co, Ni and B in addition to α-Fe, or more preferably, at least one type of Co, Y or Al. The content of Co is preferably within the range of 0 to 40 atom %, or more preferably 15 to 35 atom %, or most preferably, 20 to 35 atom %. The content of Y is preferably in the range of 1.5 to 12 atom %, or more preferably 3 to 10 atom %, or most preferably, 4 to 9 atom %. The content of Al is preferably in the range of 5 to 30 atom %, or more preferably 5 to 15 atom %, or most preferably 7 to 12 atom %. These ferromagnetic powders may be processed in advance prior to dispersion using dispersant, lubricant, surface active agent, antistatic agent, etc. More details are described in the following patent publications: JP-44-14090 (B), JP-45-18372 (B), JP-47-22062 (B), JP-47-22513 (B), JP-46-28466 (B), JP-46-38755 (B), JP-47-4286 (B), JP-47-12422 (B), JP-47-17284 (B), JP-47-18509 (B), JP-47-18573 (B), JP-39-10307 (B), JP-46-39639 (B), U.S. Pat. No. 3,026,215, U.S. Pat. No. 3,031,341, U.S. Pat. No. 3,100,194, U.S. Pat. No. 3,242,005, U.S. Pat. No. 3,389,014, etc.

The ferromagnetic alloy powder may contain small amount of hydroxide or oxide. The ferromagnetic alloy powder manufactured by the methods already known may be used. The following methods may be used: a method to reduce complex organic salt (primarily, oxalate) by the reducing gas such as hydrogen, a method to obtain Fe or Fe-Co particles by reducing iron oxide with reducing gas such as hydrogen, a method to thermally decompose metal carbonyl compound, a method to reduce by adding reducing agent such as sodium borohydride, hypophosphite, or hydrazine to aqueous solution of ferromagnetic metal, a method to obtain fine particles by evaporating metal in inert gas under reduced pressure, etc. The ferromagnetic alloy powder thus obtained can be processed using deoxidizing methods as already known, i.e. a method to immerse in an organic solvent and to dry, a method to immerse in an organic solvent and to form oxide film on the surface by blowing oxygen-containing gas into it and to dry, or a method to adjust partial pressure of oxygen gas and inert gas to form oxide film on the surface without using organic solvent.

When the ferromagnetic powder of the magnetic layer of the present invention is expressed by specific surface area according to BET method, it is preferably 45 to 80 $m^2/g$, or more preferably 50 to 70 $m^2/g$. If it is lower than 40 $m^2/g$, noise is increased. If it is more than 80 $m^2/g$, it is difficult to obtain good surface property, and it is not desirable. In the ferromagnetic powder of the magnetic layer of the present invention, crystallite size is preferably 8 to 35 nm, or more preferably 10 to 25 nm, or most preferably 14 to 20 nm. Longer axis of the ferromagnetic powder is preferably within the range of 0.02 to 0.25 μm, or more preferably 0.05 to 0.15 μm, or most preferably 0.06 to 0.1 μm.

Acicular ratio of the ferromagnetic powder is preferably in the range of 3 to 15, or more preferably 5 to 12. The value of $\sigma_s$ (saturation magnetization) of the ferromagnetic metal powder is in the range of 100 to 180 $Am^2/kg$, or more preferably 110 to 170 $Am^2/kg$, or most preferably 125 to 160 $Am^2/kg$. Coercive force of the metal powder is preferably within the range of 111.4 to 278.5 kA/m, or more preferably 143.3 to 238.7 kA/m.

Moisture content of the ferromagnetic metal powder is preferably in the range of 0.01 to 2%. It is preferable to optimize the moisture content of the ferromagnetic powder depending upon the type of the binder. It is also preferable to optimize pH value of the ferromagnetic powder through combination with the binder used. The pH value is preferably within the range of 4 to 12, or more preferably 6 to 10. When necessary, the ferromagnetic powder may be processed by surface treatment using Al, Si, P, or oxide of these substances. The amount of these substances is preferably in the range of 0.1 to 10% to the amount of the ferromagnetic powder. When it is processed by surface treatment, adsorption of lubricant such as fatty acid is decreased to less than 100 $mg/m^2$, and this is desirable. The ferromagnetic powder may contain soluble inorganic ions of Na, Ca, Fe, Ni, Sr, etc. It is preferable that these ions are not contained. But, if its content is less than 200 ppm, there is no specific influence on the property. Also, the ferromagnetic powder used in the present invention preferably contains less voids. The content of the voids is preferably less than 20 vol %, or more preferably less than 5 vol %. Regarding the shape of the powder, it may have any shape such as needle-like, grain-like or spindle-like shape so far as it satisfies the property relating to particle size. SFD of the ferromagnetic powder itself is preferably lower, i.e. it is preferably less than 0.8. It is necessary to minimize the distribution of Hc (coercive force) of the ferromagnetic powder. If SFD is lower than 0.8, it can provide good electromagnetic characteristics, high output, sharp magnetization inversion, and lower peak shift, and this is suitable for digital magnetic recording with high density. To minimize the distribution of Hc, there are methods such as a method to improve grain size distribution of goethite, or a method to prevent sintering.

As the ferromagnetic powder to be used in the magnetic layer of the present invention, hexagonal ferrite powder may also be used.

As the hexagonal ferrite, substituents of barium ferrite, strontium ferrite, lead ferrite, or calcium ferrite, or Co substituent may be used. More concretely, barium ferrite and strontium ferrite of magneto-plumbite type, magneto-plumbite type ferrite with particle surface covered with spinel, or further, barium ferrite and strontium ferrite of magneto-plumbite type partially containing spinel phase may be used. In addition to the atoms designated, the following atoms may be contained: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc. In general, element-added product such as Co—Ti, Co—Ti—Zr, Co—Ti—Zn, Ni—Ti—Zn, Nb—Zn—Co, Sb—Zn—Co, Nb—Zn, etc. may be used. Depending on raw materials and manufacturing methods, specific types of impurities may be contained.

Particle size is preferably in the range of 10 to 200 nm in hexagonal diameter, or more preferably 20 to 100 nm.

When reproduction is performed on a magnetic resistance head, it must be done at low noise. The plate diameter is preferably less than 40 nm. If it is lower than 10 nm, stable magnetization cannot be achieved due to heat variation. If it is more than 200 nm, there is high noise, and this is not suitable for high density magnetic recording. Plate ratio (plate diameter/plate thickness) is preferably in the range of 1 to 15, or more preferably 2 to 7. If the plate ratio is too low, filling property in the magnetic layer is increased, and this is desirable, but sufficient orientation cannot be obtained. If it is higher than 15, noise increases due to stacking between the particles. In the particle size of this range, specific surface area based on BET method is 10 to 200 $m^2/g$. Specific surface area approximately matches arithmetic value calculated from plate diameter and plate thickness of the particle. Crystallite size is preferably 5 to 45 nm, or more preferably 10 to 35 nm. The narrower the distribution of plate diameter and plate thickness of the particle is, the more it is preferable. It is difficult to turn to numeral value, but by randomly measuring 500 particles through examination of transmission electron micrograph, comparison can be made.

Distribution is not normal distribution in most cases. If it is expressed in standard deviation to average size through calculation, σ/average size=0.1 to 2.0. To have sharper particle size distribution, it is necessary to equalize the particle generating reaction system as much as possible and to perform the processing on the generated particles to improve distribution. For instance, a method is known, by which superfine particles are selectively dissolved in acidic solution. The product having coercive force Hc measured in magnetic substance up to 39.8 to 397.9 kA/m can be produced. The higher the value of Hc is, the more it is advantageous for the high density recording, but there is limitation due to the ability of the recording head. Normally, it is from 63.7 to 318 kA/m, or more preferably 119 to 279 kA/m. When saturation magnetization of the head exceeds 1.4 T, it is preferable to set it to 159 kA/m or more. The value of Hc can be controlled by adjusting particle size (plate diameter and plate thickness), type and amount of the elements contained, substitution site of the element, condition of particle generating reaction, etc. The saturation magnetization $\sigma_s$ is 40 to 80 Am$^2$/kg. The value of $\sigma_s$ is preferably higher. It tends to be lower in finer particles. To improve the value of $\sigma_s$, various methods are known such as the method to combine magneto-plumbite ferrite with spinel ferrite, or a method to select type and quantity of the elements contained. Also, W type hexagonal ferrite may be used.

When the magnetic substance is dispersed, the surface of magnetic substance particles may be processed using a substance matching the dispersion medium or binder. As the material for surface treatment, inorganic compound or organic compound is used. As typical examples of such compounds, there are oxides or hydroxides of Si, Al, P, etc., or various types of silane coupling agents or titanium coupling agents may be used. The quantity to blend is 0.1 to 10 weight % to the magnetic substance. The pH value of the magnetic substance is also important for dispersion. It is normally from about 4 to 12, and the optimal value depends on dispersion medium and polymer. Usually, pH value of about 6 to 10 is selected due to chemical stability and storage property of the medium. Moisture content in the magnetic substance also exerts influence on the dispersion. The optimal value is determined depending upon dispersion medium and polymer. Normally, the content of 0.01 to 2.0 weight % is chosen.

Hexagonal ferrite may be produced as follows: (1) Barium oxide, iron oxide, metal oxide substituting iron, and boron oxide as glass forming substance are mixed together to make up the desired ferrite composition. The mixture is then molten and quenched to turn to amorphous. After this is processed by re-heating treatment, it is washed and pulverized, and barium ferrite crystal powder is obtained. This is called glass crystallizing method. (2) A solution of metal salt of barium ferrite composition is neutralized with alkali. After removing side products, it is heated in liquid phase at temperature higher than 100° C. Then, it is washed, dried and pulverized, and barium ferrite crystal powder is obtained. This is called hydrothermal reaction method. (3) A solution of metal salt of barium ferrite composition is neutralized with alkali. After removing side products, it is dried and processed under 1100° C. Then, it is pulverized and barium ferrite crystal powder is obtained. This is called coprecipitation method.

The inorganic powder used in the primer layer of the present invention is nonmagnetic powder. For instance, it may be selected from inorganic compounds such as metal oxide, metal carbonate, metal sulfate, metal nitride, metal carbide, metal sulfide, etc. As the inorganic compound, the following substance may be used: α-alumina with alpha ratio of 90% or more, β-alumina, γ-alumina, θ-alumina silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. may be used alone or in combination. More preferably, titanium dioxide, zinc oxide, iron oxide, or barium sulfate may be used because grain size distribution is narrower and there are more means for providing functions. Most preferably, titanium dioxide or α-iron oxide may be used.

The nonmagnetic powder has preferably average particle size of 0.005–2 μm. When necessary, nonmagnetic powder with different average particle sizes may be combined or a single type of nonmagnetic powder may be used alone by widening the particle size distribution to provide the same effect. In particular, it is preferable that the nonmagnetic powder has average particle size of 0.01–0.2 μm. In particular, in case the nonmagnetic powder is a granular type metal oxide, it has preferably average particle size of less than 0.08 μm. In case it is needle-like metal oxide, it has preferably longer axis of less than 0.3 μm. Tap density is preferably in the range of 0.05 to 2 g/ml, or more preferably 0.2 to 1.5 g/ml. Moisture content of the nonmagnetic powder is preferably 0.1 to 5 weight %, or more preferably 0.2 to 3 weight %, or most preferably 0.3 to 1.5 weight %. The nonmagnetic powder has preferably pH value of 2 to 11, or more preferably 5.5 to 10. Specific surface area of the nonmagnetic powder is preferably in the range of 1 to 100 m$^2$/g, or more preferably, 5 to 80 m$^2$/g, or most preferably 10 to 70 m$^2$/g. Crystallite size of the nonmagnetic powder is preferably between 0.004–1 μm, or more preferably 0.04–0.1 μm. Oil absorption using DBP is preferably 5–100 ml/100 g, or more preferably 10–80 ml/100 g, or most preferably 20–60 ml/100 g. Specific gravity is preferably 1–12, or more preferably 3–6. The shape may be needle-like, spherical, polygonal or planar shape.

Ignition loss is preferably less than 20 weight %. The nonmagnetic powder used in the present invention has preferably Morse hardness from 4 to 10. Roughness factor on powder surface is preferably in the range of 0.8 to 1.5, or more preferably 0.9 to 1.2.

Stearic acid adsorption of the nonmagnetic powder is preferably in the range of 1 to 20 μmol/m$^2$, or more preferably 2 to 15 μmol/m$^2$, or most preferably 3 to 8 μmol/m$^2$. The heat of wetting to water of the nonmagnetic powder at 25° C. is preferably within the range of 0.2 to 0.6 J/m$^2$. Also, a solvent within the range of this heat of wetting can be used. It is preferable that pH value is between 3 and 6. The content of water-soluble sodium in the nonmagnetic powder is preferably from 0 to 150 ppm, and the content of water-soluble calcium is preferably within the range of 0 to 50 ppm.

On the surface of the nonmagnetic powder, it is preferable that there are provided Al$_2$O$_3$, SiO$_2$, TiO$_2$, ZrO$_2$, SnO$_2$, Sb$_2$O$_3$, ZnO, and Y$_2$O$_3$ by surface treatment. In particular, it is preferable that Al$_2$O$_3$, SiO$_2$, TiO$_2$ and ZrO$_2$ are provided to have high dispersion property. Or, more preferably Al$_2$O$_3$, SiO$_2$ and ZrO$_2$ are used. These may be used in combination or alone. Further, depending on the purpose, surface treatment layer prepared by coprecipitation may be used, or after treating with alumina, the surface layer may be treated with silica, or this procedure may be reversed. The surface treatment layer may be porous depending on the purpose, while it is preferably homogenous and dense.

Concrete examples of the nonmagnetic powder to be used in the primer layer of the present invention are as follows: Nanotite (manufactured by Showa Denko Co., Ltd.), HIT-100 and ZA-G1 (manufactured by Sumitomo Chemical Co., Ltd.), α-hematite DPN-250, DPN-250BX, DPN-245, DPN-270BX, DBN-SA1, and DBN-SA3 (manufactured by Toda Kogyo Corporation), titanium oxide TTO-51B, TTO-55A, TTO-55B, TTO-55C, TTO-55S, TTO-55D, SN-100, α-hematite E270, E271, E300, and E303 (manufactured by Ishihara Industry Co., Ltd.), titanium oxide STT-4D, STT-30D, STT-30, STT-65C, and α-hematite α-40 (manufactured by Titanium Industry Co., Ltd.), MT-100S, MT-100T, MT-150W, MT-500B, MT-600B, MT-100F, and MT-SOOHD (manufactured by Teika), FINEX-25, BF-1, BF-10, BF-20, and ST-M (manufactured by Sakai Chemical Co., Ltd.), DEFIC-Y and DEFIC-R (manufactured by Dowa Mining Co., Ltd.), AS2BM, and TiO2P25 (manufactured by Japan Aerogil Co., Ltd.), 100A and 500A and a product obtained by firing of these products (manufactured by Ube Industries, Ltd.). In particular, it is preferable to use titanium dioxide and α-iron oxide as the nonmagnetic powder.

When carbon black is mixed in the lower coating layer, surface electric resistance Rs can be decreased and light transmittance can be reduced. Also, it is possible to have micro Vickers hardness as desired. When carbon black is added to the lower layer, good effects for storage of lubricant can be provided. As the type of carbon black, furnace type for rubber, thermal type for rubber, black for color, acetylene black, etc. may be used. Based on the desired effects, the property of the carbon black on the lower layer should be optimized. The better effect may be obtained when these are simultaneously used.

Specific surface area of the carbon black is preferably 100–500 m$^2$g, or more preferably 150–400 m$^2$/g. DBP oil absorption is preferably 20–400 ml/100 g, or more preferably 30–200 ml/100 g. Average particle size of the carbon black is preferably 5–80 m$\mu$, or more preferably 10–50 m$\mu$, or most preferably 10–40 m$\mu$. The pH value of the carbon black is preferably 2–10. Moisture content is preferably 0.1–10%, and tap density is preferably 0.1–1 g/ml. Concrete examples of carbon black used in the present invention are: Blackpearls 2000, 1300, 1000, 900, 800, 880, 700, and Vulcan XC-72 (manufactured by Cabot Inc.), #3050B, #3150B, #3250B, #3750B, #3950B, #950, #650B, #970B, #850B, and MA-600 (manufactured by Mitsubishi Chemical Corporation), Conductex SC, Raven 8800, 8000, 7000, 5750, 5250, 3500, 2100, 2000, 1800, 1500, 1255, and 1250 (manufactured by Columbia Carbon Co.), Ketchenblack EC (manufactured by Akzo), etc. may be used. Carbon black may be processed by surface treatment using dispersant or may be graphitized and used, or a part of the surface may be graphitized and used. Also, before carbon black is added to the coating material, it may be dispersed using a binder. These types of carbon black may be used in the range not exceeding 50 weight % to the inorganic powder and also in a range not exceeding 40% of total weight of the nonmagnetic layer. These types of carbon black may be used alone or in combination. For the details of the carbon black to be used in the present invention, reference should be made to: "Handbook of Carbon Black" (compiled by the Japanese Carbon Black Society).

Organic powder may be added to the lower coating layer. For instance, acryl styrene type resin powder, benzoguanamine resin powder, melamine type resin powder, phthalocyanine type pigment, etc. may be used. Also, polyolefin type resin powder, polyester type resin powder, polyamide type resin powder, polyimide type resin powder, or polyethylene fluoride resin may be used. The methods to produce these products are described in JP-62–18564(A) and JP-60-255827(A).

As binder resin, lubricant, dispersant, additive, solvent, or dispersion method, etc. for the primer layer, those of the magnetic layer can be applied. In particular, for quantity and type of the binder resin, and adding quantity and type of the additive and the dispersant, the technique already known on the magnetic layer may be applied.

The content of the binder in the primer layer is preferably 15 to 40 weight parts to 100 weight parts of the nonmagnetic powder. Thus, it is preferable to have more binder in the lower layer.

The coating solution prepared using the above materials is coated on a nonmagnetic support, and a lower coating layer or a magnetic layer is prepared. As the nonmagnetic support to be used in the present invention, polyethylene naphthalate, polyethylene terephthalate, polyamide, polyimide, polyamideimide, aromatic polyamide, polybenzoxidazole, etc. processed by biaxial stretching may be used. More preferably, polyethylene naphthalate and aromatic polyamide are used. The nonmagnetic support member may be processed in advance by corona discharge, plasma treatment, adhesive processing, heat treatment, etc. The nonmagnetic support member to be used in the present invention has preferably a surface with such superb smoothness that it has average surface roughness on central line of 0.1–20 nm with cutoff value of 0.25 mm, or more preferably within the range of 1–10 nm. Also, it is preferable that the nonmagnetic support member not only has lower average surface roughness on the central line but also has no coarse projection of more than 1 $\mu$.

The preferable thickness of the nonmagnetic support in the magnetic recording medium of the present invention is 4 to 100 $\mu$m.

On the surface of the nonmagnetic support of the present invention without being coated with the magnetic coating material, a back-coat layer (backing layer) may be provided. On the back-coat layer, a coating material for the back-coat layer is coated on the surface of the nonmagnetic support where the magnetic coating material is not coated. The coating material for the back-coat layer contains granular components such as abrasive and antistatic agent with the binder dispersed in an organic solvent. As the granular components, various types of inorganic pigment or carbon black may be used. As the binder, nitrocellulose, phenoxy resin, vinyl chloride type resin, resin such as polyurethane may be used alone or in combination. On the surface of the nonmagnetic support where the magnetic coating material and the back-coat layer coating material are coated, an adhesive layer may be provided.

To manufacture the magnetic recording medium of the present invention, for instance, a coating solution for the primer layer and a magnetic coating solution are coated on the surface of the nonmagnetic support under running condition to have the film thickness as desired. The coating solution for the primer layer and the coating solution for the magnetic layer may be coated successively or at the same time. As the coating device for coating the coating solution for the primer layer or the coating solution for the magnetic layer, air doctor coat, blade coat, rod coat, extrusion coat, air knife coat, squeeze coat, impregnation coat, reverse roll coat, transfer roll coat, gravure coat, kiss coat, cast coat, spray coat, spin coat, etc.

For these devices, reference may be made on "The Newest Coating Technique" published by Sogo Gijutsu Center, Co., Ltd. (May 31, 1983). When the present invention is applied to a magnetic recording medium, the following devices and methods can be proposed:

(1) Using a coating device such as gravure, roll, blade, extrusion, etc. generally applied in the coating of the magnetic coating material, a lower layer is coated at first. While the lower layer is not yet dried, the upper layer is coated using a support pressure type extrusion coating device as disclosed in JP-1-46186(B), JP-60238179(A), JP-022065672(A), etc.

(2) Using a coating head having two slits for passing the coating solution as disclosed in JP-63088080(A), JP-02017971(A), or JP-02265672(A), the upper layer and the lower layer are coated almost at the same time.

(3) Using an extrusion coating device with backup roll as disclosed in JP-02174965(A), the upper layer and the lower layer are coated almost at the same time. The coating layer coated with the magnetic coating solution is dried after magnetic field orientation processing is performed on the ferromagnetic powder contained in the coating layer coated with the magnetic coating solution.

After drying as described above, surface smoothening processing is performed on the coating layer. For the surface smoothening processing, super-calender roll or the like is used. By the surface smoothening processing, voids generated by the removal of solvent during drying process are eliminated. Filling ratio of the ferromagnetic powder in the magnetic layer is improved, and a magnetic recording medium with high electromagnetic transfer characteristics can be obtained. As the roll for calender processing, heat-resistant plastic roll made of material such as epoxy, polyimide, polyamide, polyamideimide, etc. is used. Also, a metal roll may be used.

For example, specific types of ferromagnetic powder and the binder are selected as described above, and the magnetic layer is prepared, and calender processing as described above may be carried out. The conditions for the calender processing are as follows: The temperature of the calender roll is preferably within the range of 60° C.–100° C., or more preferably 70° C.–100° C., or most preferably 80° C.–100° C. Linear pressure is preferably within the range of 98.0–490 kN/m, or more preferably 196–441 kN/m, or most preferably 294–392 kN/m. The magnetic recording medium thus prepared can be used by cutting to a size as desired using a cutter.

The preferred thickness of the magnetic layer in the magnetic recording medium of the present invention is 0.05 to 1 μm.

Because the thickness of the magnetic layer in the magnetic recording medium of the present invention is very thin, being as thick as 0.05 to 1 μm, and it is possible to obtain a magnetic recording medium having good electromagnetic characteristics.

On the other hand, when a thin magnetic layer is directly formed on the nonmagnetic support, it is not possible to obtain high durability even when triester with good lubricating property is added. Also, the smoothness of the magnetic layer is not satisfactory. Noise is high, and electromagnetic transfer characteristics are not high enough. However, when a primer layer is formed and triester compound is added at least to the primer layer, the product with good property can be obtained when the magnetic layer is coated and dried, and it is processed by calender processing.

In the magnetic recording medium of the present invention, average surface roughness on the central line is in the range of 1.0 to 3.5 nm with cutoff value of 0.25 mm, or more preferably, in the range of 1.0 to 3.0 nm, and the surface with superb smoothness can be obtained.

As described above, a magnetic layer with very smooth surface can be prepared in the magnetic recording medium of the present invention, and it also has very high durability and good high-speed durability under high temperature condition.

In particular, for the improvement of surface smoothness, the combination with the primer layer is important, and such superb features cannot be expected in the magnetic recording medium with the conventional type single magnetic layer.

Even when the triester compound is added only to the primer layer, it is gradually exuded to the surface of the magnetic layer after the magnetic recording medium has been prepared, and the durability of the product can be extensively improved.

[EMBODIMENTS]

Description will be given below on several examples of the present invention. In the examples, the term "part(s)" means "weight part(s)".

(Examples 1 to 7 and Comparative example 3)

(Preparation of the magnetic coating material for the upper layer)

Using an open kneader, 100 parts of ferromagnetic alloy powder A (composition: Fe:Co:Al=100:20:9:6 (atom ratio); Hc: 159 kA/m; crystallite size: 15 nm; BET specific surface area: 59 m²/g; longer axis diameter: 0.09 μm; acicular ratio: 7; $\sigma_s$: 140 Am²/kg) were pulverized for 10 minutes. Then, 7.5 weight parts of vinyl chloride type copolymer (MR110; Nippon Zeon Co., Ltd.), 5 parts (solid matter) of polyurethane resin containing sulfonic acid (UR8200; Toyobo Co., Ltd.), and 60 parts of cyclohexanone were added, and the mixture was kneaded for 60 minutes. Next, the following substances were added:

| | |
|---|---|
| α-alumina (HIT55; Sumitomo Chemical Co., Ltd.) | 10 parts |
| Carbon black (#50; Asahi Carbon Co.) | 3 parts |
| Methyl ethyl ketone/toluene (1/1 in weight ratio) | 200 parts |

Next, the mixture was dispersed for 120 minutes in a sand mill. Then,

| | |
|---|---|
| Polyisocyanate (Coronate 3041; Nippon Polyurethane Co., Ltd.) | 5 parts (solid matter) |
| Compound shown in Table 1 | 4 parts |
| Stearic acid | 1 part |
| Oleic acid | 1 part |
| Methyl ethyl ketone | 50 parts | were added, and the mixture was further stirred up and kneaded for 20 minutes. Then, the mixture was filtered using a filter with average bore of 1 μm, and a magnetic coating material was prepared.

(Preparation of nonmagnetic coating material for the lower layer)

Using an open kneader, 85 parts of titanium oxide (average particle size: 0.035 μm; Crystal type: rutile; $TiO_2$ content: 90% or more; surface treatment layer: alumina; BET specific surface area: 35–42 m²/g; true specific gravity: 4.1; pH: 6.5–8.0) and 15 parts of carbon black (Ketchenblack: Nippon EC) were pulverized for 10 minutes. Then, 17 parts of vinyl chloride type copolymer (MR110: Nippon Zeon Co., Ltd.), 10 parts (solid matter) of polyurethane resin containing sulfonic acid (UR8200; Toyobo Co., Ltd.) and 60 parts of cyclohexanone were added, and the mixture was kneaded for 60 minutes. Then,

| | |
|---|---|
| Methyl ethyl ketone/cyclohexanone (6/4 in weight ratio) | 200 parts | were added, and the mixture was dispersed for 120 unites in a sand mill. Then, the following substances were added:

| | |
|---|---|
| Lubricant shown in Table 1 | 4 parts |
| Polyisocyanate (Coronate 3041; Nippon Polyurethane Co., Ltd.) | 5 parts (Solid matter) |
| Stearic acid | 1 part |
| Oleic acid | 1 part |
| Methyl ethyl ketone | 50 parts |

The mixture was further stirred up and mixed for 20 minutes and was filtered using a filter with average bore of 1 μm, and a nonmagnetic coating material was prepared.

On the surface of a polyethylene terephthalate support of 62 μm in thickness, the nonmagnetic coating material prepared above was coated to 1.5 μm in thickness, and immediately thereafter, the magnetic coating material was coated to have thickness of 0.2 μm after drying by simultaneous multi-layer coating. While the two layers are not yet dried, it was passed through an AC magnetic field generator with two types of magnetic field intensity, i.e. frequency of 50 Hz and $2.5 \times 10^{-2}$ T or frequency of 50 Hz and $1.2 \times 10^{-2}$ T. Then, random orientation processing was performed. Further, after this was dried, it was processed by 7-stage calender processing under the condition of: 100 m/min. in speed, 294 kN/m (300 kgf/cm) in linear pressure, and temperature of 90° C. Then, it was punched to 3.7 type disk and the surface was polished. Then, it was placed in a disk cartridge for Zip (Iomega Inc.) with a liner provided in it. By adding the designated components, a floppy disk was prepared.

The floppy disk thus prepared was evaluated by the evaluation methods as given below. The results of evaluation are summarized in Table 2.

(Comparative examples 1 and 2)

A floppy disk was prepared by the same procedure as in Example 1 except that the primer layer was not coated, and a magnetic layer was coated directly on the support.

The floppy disk thus prepared was evaluated by the evaluation methods as given below. The results are shown in Table 2.

(Evaluation methods)

(1) Electromagnetic transfer characteristics

On a disk evaluation system (RWA1001 model; Guzik Inc.) and a spin stand (LS-90; Kyodo Electronics System), using a metal-in gap head of 0.3 μm in gap length, reproduction output (TAA) at linear recording density of 60 kfci/h and noise after DC erasing were determined at a position of 24.6 mm in radius, and S/N value was obtained. Relative S/N value was evaluated by regarding S/N of the comparative example 1 as 0 dB.

(2) Durability

Using a floppy disk drive (ZIP100; Iomega Inc.; 2968 rpm), the head was fixed at a position of 38 mm in radius, and recording was performed at recording density of 34 kfci. Then, the signal was reproduced, and the reproduction signal was regarded as initial reproduction signal. Then, running operation was performed for 1500 hours under the conditions of 55° C. and 20% RH and 25° C. and 50% RH respectively. Output was measured every 24 hours of running. When it was reduced to less than 70% of the initial reproduction signal, it was defined as "defective", and it was expressed as the time after the initiation of the reproduction.

(3) Calender moldability

Surface roughness of the magnetic layer before and after the calender processing was determined. Using a digital optical profimeter (manufactured by WYKO), average surface roughness Ra at central line was measured with cutoff value of 0.25 mm by optical interference method, and the decrement of roughness by the calender was obtained.

TABLE 1

| | Structure of compound | $R^1$ | $R^2, R^3, R^4$ |
|---|---|---|---|
| Compound A | General formula (1) | —$C_2H_5$ | —$CH_2(CH_2)_3CH_3$ |
| Compound B | General formula (1) | —$C_2H_5$ | —$CH(CH_2CH_3)(CH_2)_3CH_3$ |
| Compound C | General formula (1) | —$C_2H_5$ | —$CH_2(CH_2)_5CH_3$ |
| Compound D | General formula (1) | —$C_2H_5$ | —$CH_2(CH_2)_9CH_3$ |
| Compound E | General formula (1) | —$CH_3$ | —$CH_2(CH_2)_{15}CH_3$ |
| Compound F | General formula (2) | — | —$CH_2(CH_2)_9CH_2$ |
| Compound G | n-butylstearate | | |

TABLE 2

| | Compound | | Electro-magnetic transfer characteristics | Durability (hour) | | Calender moldability | | |
|---|---|---|---|---|---|---|---|---|
| | Upper magnetic layer | Non-magnetic lower layer | S/N (dB) | 25° C. 50% RH | 55° C. 50% RH | After coating Ra | After calendering Ra | ΔRA |
| Example 1 | Compound A | Compound A | 1.6 | 1500 | 1500 | 11.8 | 2.9 | 8.9 |
| Example 2 | Compound B | Compound B | 1.5 | 1500 | 1500 | 11.8 | 2.8 | 9 |
| Example 3 | Compound C | Compound C | 1.7 | 1500 | 1500 | 11.8 | 2.9 | 8.9 |
| Example 4 | Compound D | Compound D | 1.6 | 1500 | 1500 | 11.7 | 2.8 | 8.9 |
| Example 5 | Compound E | Compound E | 1.6 | 1500 | 1500 | 11.8 | 2.8 | 9 |
| Example 6 | Compound F | Compound F | 1.4 | 1500 | 1500 | 11.9 | 3.1 | 8.8 |
| Example 7 | Not added | Compound B | 1.6 | 1500 | 1500 | 11.9 | 2.8 | 9.1 |
| Comparative | Compound | — | 0 | 123 | 31 | 12.3 | 4.2 | 8.1 |

TABLE 2-continued

| | Compound | | Electro-magnetic transfer charac- teristics | Durability (hour) | | Calender moldability | | |
|---|---|---|---|---|---|---|---|---|
| | Upper magnetic layer | Non-magnetic lower layer | | 25° C. | 55° C. | After coating | After calender- ing | |
| | | | S/N (dB) | 50% RH | 50% RH | Ra | Ra | ΔRA |
| example 1 | G | | | | | | | |
| Comparative example 2 | Compound A | — | 0.1 | 226 | 65 | 11.9 | 3.8 | 8.1 |
| Comparative example 3 | Compound G | Compound G | 0 | 142 | 41 | 12.4 | 4.3 | 8.1 |

According to the present invention, at least a specific type of ester compound was used as a lubricant in the primer layer, and it is possible to improve electromagnetic transfer characteristics on a high density recording medium. Also, it is possible to improve 10 durability on a disk type medium for high recording density and to improve durability under high temperature condition. Also, calender moldability is high, and a magnetic layer with smooth surface can be prepared.

What is claimed is:

1. A magnetic recording medium, comprising a primer layer containing at least a nonmagnetic lower layer on a support and at least one layer of magnetic layer with ferromagnetic powder dispersed in a binder, said magnetic layer being provided on said primer layer, whereby at least one compound selected from at least one of the following general formulae (1) and (2) is contained at least in the primer layer:

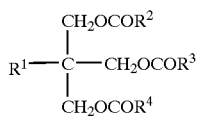

General formula (1)

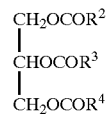

General formula (2)

where
R$^1$ is an alkyl group with 1 to 2 carbon atoms; and R$^2$, R$^3$, and R$^4$ each represents a hydrocarbon group having 8 to 17 carbon atoms, and R$^2$, R$^3$, and R$^4$ may be the same or may be different from each other.

2. A magnetic recording medium according to claim 1, wherein said hydrocarbon group is a saturated hydrocarbon group.

3. A magnetic recording medium according to claim 1, wherein said hydrocarbon group is a straight-chain hydrocarbon group.

4. A magnetic recording medium according to claim 1, wherein the ferromagnetic powder used in the magnetic layer is ferromagnetic alloy powder containing either α-Fe or hexagonal ferrite powder as main component.

5. A magnetic recording medium according to claim 1, wherein thickness of said magnetic layer is within the range of 0.05 to 1 μm.

6. A magnetic recording medium according to claim 1, wherein said medium is a disk.

7. A magnetic recording medium, comprising a primer layer containing at least a nonmagnetic lower layer on a support and at least one layer of magnetic layer with ferromagnetic powder dispersed in a binder, said magnetic layer being provided on said primer layer, whereby at least one compound selected from the following compounds D to F is contained at least in the primer layer:

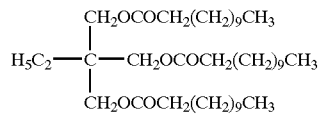

Compound D

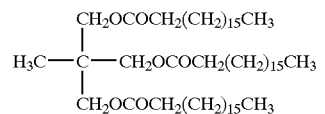

Compound E

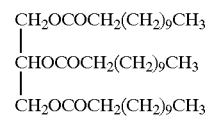

Compound F

* * * * *